United States Patent Office 2,736,610
Patented Feb. 28, 1956

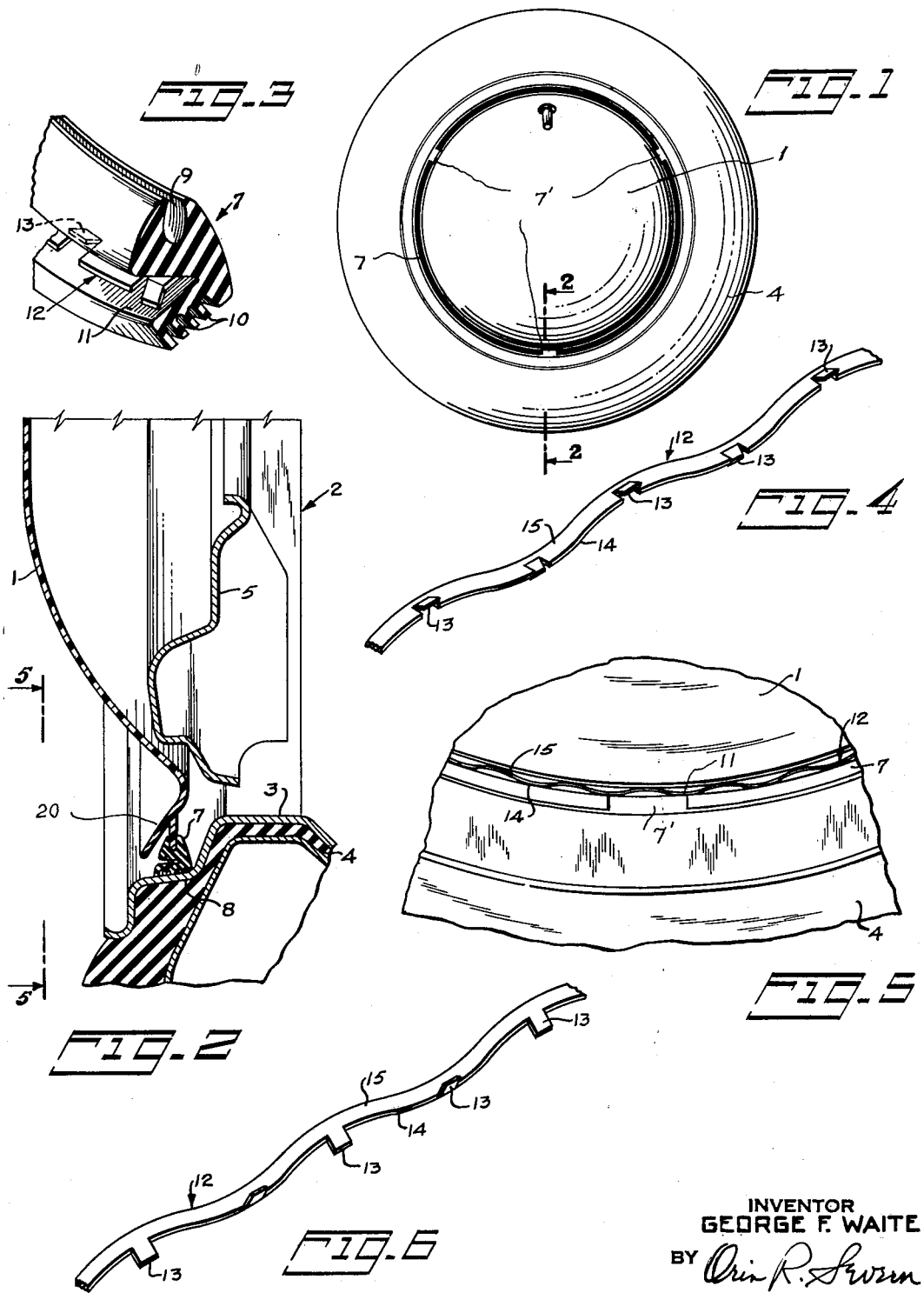

2,736,610

ORNAMENTAL HUB CAP WITH TEMPERATURE COMPENSATING RETAINING MEANS

George F. Waite, Pelham, N. Y., assignor to Curtiss-Wright Corporation, a corporation of Delaware Application February 26, 1954, Serial No. 412,746

5 Claims. (Cl. 301—37)

My invention relates to ornamental hub caps or wheel covers for automotive vehicles. The invention is concerned with wheel covers of a disc type constructed from a light-weight material as for example aluminum or plastic and is more particularly directed to a wheel cover of this type having an annular bead of resilient material for frictionally engaging the wheel rim of a vehicle for holding the cover on the wheel. A wheel cover such as described is shown in my co-pending application Serial Number 387,679, filed October 22, 1953.

It is a principal object of this invention to provide a wheel cover of the described type which is particularly adapted for remaining in position on a car wheel despite a loss of resiliency in the retaining bead and contraction of the disc caused for example by a marked drop in ambient temperature.

It is another object of my invention to provide such a wheel cover having a compensating ring or band of resilient material capable of maintaining its resiliency under very low temperature conditions disposed in a circumferential lateral groove in the retaining bead for maintaining the bead in tight fitting contact with the wheel rim regardless of a material loss in resiliency of the bead and contraction of the wheel cover.

The invention will be more fully set forth in the following description referring to the accompanying drawings, and the features of novelty will be pointed out with particularity in the claims annexed to and forming a part of this specification.

Referring to the drawings,

Fig. 1 is a side elevational view of an automobile wheel fitted with a wheel cover constructed in accordance with my invention.

Fig. 2 is an enlarged sectional view taken on the plane of the line 2—2 of Fig. 1.

Fig. 3 is an enlarged perspective view of the annular retaining bead showing the compensating ring or band for maintaining the bead in contact with the wheel rim.

Fig. 4 is an enlarged development in perspective of the compensating ring or band.

Fig. 5 is an enlarged fragmentary elevational view showing the compensating ring or band in position in the lateral groove of the retaining bead.

Fig. 6 is an enlarged development in perspective of a modified form of compensating ring or band for the retaining bead.

The wheel cover 1 also commonly known as a hub cap is shown mounted on an automobile wheel 2 which includes a metal rim portion 3 for supporting a tire 4, and a body portion 5 which extends outwardly from the wheel axis to the rim and is connected to the rim portion in some suitable manner as by rivets. Preferably wheel cover 1 is formed from a plastic material, as for example cellulose acetate butyrate material, rigid vinyl or impact styrene, although any other suitable light weight material such as aluminum may be utilized. The wheel cover is secured to the wheel by frictional engagement therewith by means of a resilient bead 7 attached to a peripheral edge of the cover. Bead 7 which is preferably formed from rubber but alternately may be formed from a suitable plastic as for example polyvinyl chloride or polyethylene is caused to engage the flange 8 of rim 3 when the cover is pressed into position on the wheel, and in such engagement the cover is prevented from becoming dislodged from the wheel despite shock and vibration to which the wheel is subjected as it travels over varying conditions of road. An important consideration is of course that the coefficient of friction between the material used for the retaining bead and the steel flange be high. Rim flange 8 is substantially parallel to the wheel axis extending at only a small angle to the horizontal in the normal position of the wheel on a vehicle so that there is little or no chance for the cover to be dislodged laterally from the wheel.

Preferably the wheel cover 1 is provided with a skirt portion 20 for concealing peripheral bead 7. This skirt portion may be formed as an integral portion of the cover as shown and extends into fairly close proximity to the rim. Preferably an opening is provided between the rim and peripheral edge of the skirt portion, and the bead 7 is provided with a number of cut-outs 7' in the outer edge to permit the insertion of a screw driver or equivalent tool into the opening in the cover and through one of the cut-outs 7' for removing the cover from the wheel. The cutouts 7' also provide openings for drainage purposes.

The retaining bead 7 has a tapered slit 9 which extends generally vertically to receive the peripheral or attaching edge of the wheel cover and has a plurality of serrations 10 which provide for multiple line contact with the rim flange 8. The bead 7 may be force-fitted to the wheel cover 1, the upper ends of the slit being caused to grip the opposite surface of the cover by reason of the taper of the slit or the surfaces of the slit may be cemented to the wheel cover. The serrations 10 are of importance in determining a fixed position for the wheel cover on the wheel, the multiple line-contact engagement between the rim and said serrations offering great resistance to sliding or slipping of the bead on the flange.

The bead 7 is also provided with a circumferential slot-like groove 11 extending laterally therein. This groove is provided to compensate for dimensional changes in the wheel cover caused by varying climatic conditions. In the fitted position of the cover on the wheel the groove 11 is closed somewhat and the serrations 10 are evenly compressed against the rim flange. The groove 11, however, remains open to an extent such that any increase in the dimensions of the wheel cover can be taken up in the groove. In the event the over-all dimension of the wheel cover is reduced due for example to a decrease in ambient temperature the groove 11 opens somewhat.

For the purpose of rendering the bead more effective in retaining the wheel cover on the wheel, the groove 11 is fitted with a compensating ring or band 12 of resilient material for forcing that portion of the bead extending outwardly from groove 11 into tight fitting contact with rim flange 8 in the event there is insufficient resiliency in the bead to effect a tight fitting contact as the groove opens. Insufficient natural resiliency in the bead may be encountered under low temperature conditions effecting not only a material reduction in the over-all dimension of the wheel cover but producing a cold set in the material of the bead. In this event the material resiliency of the bead is replaced by the resiliency of the compensating ring or band 12 which is selected from a material which is not subject to a material loss in resiliency at low temperatures. Suitable materials for the ring or band 12 are for example spring steel and berrylium copper.

Although the ring or band 12 may be formed from a rod of resilient material or it may have any other suitable form, preferably the ring or band is formed from a long strip of resilient material which is wave-like in form in development. This ring or band is provided with tabs 13 extending at an angle to the surface of the band for anchoring the band in the groove of the bead. The tabs 13 may be formed in the manner shown in Fig. 4 by cutting into the band from one edge at high and low points along its length and bending the partially cut out pieces at an angle to the inner and outer surfaces 14 and 15 respectively of the band. As shown adjacent tabs 13 are off-set in different directions to dig into opposite surfaces of the groove 11. Alternately tabs 13 may be formed as integral extensions of the band extending from one edge as shown in Fig. 6, such integral extensions also being located at the high and low points along the band and off-set at an angle to the inner and outer surfaces with adjacent tabs extending in different directions to engage the opposite surface of groove 11.

In order to secure the hub cap to the wheel the wheel cover with its resilient bead 7 is force-fitted to the wheel rim. The wave-like formations of ring or band 12 are subjected to a compressive force and the tabs 13 dig into opposite surfaces of the groove to anchor the ring or band along its length in the groove. In the event the ambient temperature drops to a point such that the bead 7 loses a considerable portion of its resiliency and a material dimensional change is effected in the wheel cover 1 tending to move the bead 7 away from the flange 8, the band 12 is nevertheless effective to maintain the bead in tight fitting contact with the flange. The ring or band 12 also assists in maintaining the bead in tight fitting contact with the flange under less severe conditions.

Obviously usage of the term bead as applied to the rubber or plastic annular member for frictionally engaging the wheel flange 8, and of the terms ring or band as applied to the compensating means disposed in the groove 11 of the bead is not intended to limit these parts to any particular form and that their cross sectional area may assume any suitable geometric form.

It will now be apparent that I have provided a wheel cover of extremely simple construction which is nevertheless effective in performing its intended purpose even under severe operating conditions. I have provided a wheel cover which may be secured to a wheel merely by frictional engagement of an annular resilient retaining bead with the wheel rim, and which is particularly adapted to remain in position on the wheel despite a loss in resiliency of the retaining bead and a contraction of the disc due for example to marked drop in ambient temperature.

Since no metal parts are required in my wheel cover, other than the compensating ring or bead, lightness in weight is assured. This lightness is of course advantageous in so far as it is a factor in keeping the unsprung weight of a vehicle at a minimum. Further beneficial results due to lightness in weight include keeping to a minimum the amount of end thrust which the wheels of a vehicle may exert against wheel bearings or axles when the vehicle is being turned or driven around a curve.

In the case of a wheel cover constructed largely from plastic or other non-metallic material in the manner hereinbefore described, the opportunity for metal to metal contact between the parts of the wheel cover, and between the cover and the wheel structure is eliminated. There is therefore no possibility of noise due to contact between metal parts such as is otherwise often encountered especially during braking when the greatest likelihood exists of relative motion between moving parts.

It should be understood that this invention is not limited to specific details of construction and arrangement thereof herein illustrated, and that changes and modifications may occur to one skilled in the art without departing from the spirit of the invention.

What is claimed is:

1. An ornamental hub cap for a wheel structure having a body part extending outwardly from the wheel axis and a tire rim secured to said part, and having a flange portion on which said hub cap is mounted extending generally parallel to said wheel axis, said hub cap comprising a generally circular member of sheet material having an annular bead of rubber-like material to enter into tight fitting contact with said flange for holding the hub cap on the wheel by frictional engagement of the bead with said flange, the bead having a circumferential slot-like groove extending laterally into a side wall thereof, and a resilient ring mounted in said groove so as to exert an outward force on the flange-engaging portion of the bead for maintaining the bead in tight-fitting contact with the flange in the event there is a loss of resiliency in the bead due to a material drop in ambient temperature.

2. An ornamental hub cap for a wheel structure having a body part extending outwardly from the wheel axis and a tire rim secured to said part, and having a flange portion on which said hub cap is mounted extending generally parallel to said wheel axis, said hub cap comprising a generally circular member of sheet material having an annular bead of rubber-like material to enter into tight fitting contact with said flange for holding the hub cap on the wheel by frictional engagement of the bead with said flange, the bead having a circumferential slot-like groove extending laterally into a side wall thereof, and a resilient metallic ring in said groove including means for anchoring said ring in the groove, said ring being shaped to contact opposite sides of the groove at spaced intervals, the ring formations being under compression and exerting an outward force on the flange-engaging portion of the bead for maintaining the bead in tight-fitting contact with the flange in the event there is a loss of resiliency in the bead due to drop in ambient temperature.

3. An ornamental hub cap for a wheel structure having a body part extending outwardly from the wheel axis and a tire rim secured to said part, and having a flange portion on which said hub cap is mounted extending generally parallel so said wheel axis, said hub cap comprising a generally circular member of sheet material having an annular bead of rubber-like material to enter into tight fitting contact with said flange for holding the hub cap on the wheel by frictional engagement of the bead with said flange, the bead having a circumferential slot-like groove extending laterally into the outside wall thereof, and a resilient metallic strip formed into a ring and disposed in said groove having a plurality of integral tabs for anchoring the ring in the groove, said ring having a wave-like form with said tabs at high and low points and at an angle to inner and outer surfaces for digging into the bead, the ring formations being under compression and exerting an outward force on the portion of the bead spaced from the disc-like member by said groove for maintaining the bead in tight fitting contact with the flange in the event there is a loss of resiliency in the bead due to drop in ambient temperature.

4. An ornamental hub cap for a wheel structure having a body part extending outwardly from the wheel axis and a tire rim secured to said part, and having a flange portion on which said hub cap is mounted extending generally parallel to said wheel axis, said hub cap comprising a generally circular member of plastic material having an annular bead of rubber to enter into tight fitting contact with said flange for holding the hub cap on the wheel by frictional engagement of the bead with said flange, the bead having a circumferential slot-like groove extending laterally into the outside wall thereof, and a resilient metallic strip formed into a ring and disposed in said groove having a plurality of integral tabs extending from one edge of the ring for anchoring the ring in the groove, said ring having a wave-like form with said tabs at high and low points and at an angle to inner and outer surfaces of the ring for digging into the bead, the ring formations being under compression and exerting an outward force on the portion of the bead spaced from the disc-like member by said groove for maintaining the bead in tight fitting contact with the flange in the event there is a loss of resiliency in the bead due to drop in ambient temperature.

5. The combination as defined in claim 4 wherein the tabs comprise portions of the ring cut out of one edge and bent at an angle to inner and outer surfaces of the ring for digging into opposite sides of the bead.

References Cited in the file of this patent

UNITED STATES PATENTS

| | | |
|---|---|---|
| 1,373,889 | Johnston | Apr. 5, 1921 |
| 1,969,088 | Maranville | Aug. 7, 1934 |
| 2,618,513 | Horn | Nov. 18, 1952 |